United States Patent [19]

Maffet

[11] Patent Number: 5,058,863

[45] Date of Patent: Oct. 22, 1991

[54] PANEL APPARATUS AND ELEMENTS FOR SECURING A PLURALITY OF PANELS TOGETHER

[76] Inventor: Harold C. Maffet, 20 Kiji Dava, Prescott, Ariz. 86301

[21] Appl. No.: 558,592

[22] Filed: Jul. 27, 1990

Related U.S. Application Data

[63] Continuation-in-part of Ser. No. 245,015, Sep. 15, 1988, abandoned.

[51] Int. Cl.$^5$ .............................................. F16B 7/00
[52] U.S. Cl. ..................................... 256/26; 160/135; 24/17 B; 24/482
[58] Field of Search ............................ 256/25, 26, 27; 160/135, 351, 352; 24/17 B, 482, 481, 339

[56] References Cited

U.S. PATENT DOCUMENTS

| | | | |
|---|---|---|---|
| 1,168,836 | 1/1916 | Vette | 256/25 X |
| 3,669,491 | 6/1972 | Weslock | 24/339 X |
| 3,913,598 | 10/1975 | Glutting, Jr. | 160/135 X |
| 3,962,827 | 6/1976 | Chaffee | 160/135 X |
| 4,335,490 | 6/1982 | Teachout | 24/17 B X |
| 4,765,495 | 8/1988 | Bisk | 24/336 X |
| 4,774,792 | 10/1988 | Ballance | 160/135 X |

FOREIGN PATENT DOCUMENTS 723503  2/1955  United Kingdom ................ 160/352

Primary Examiner—Andrew V. Kundrat
Attorney, Agent, or Firm—H. Gordon Shields

[57] ABSTRACT

Panel apparatus includes a plurality of panels which may be fabricated or assembled into enclosures of various types, as desired by a user. Adjacent panels are secured together by any of several different types of fastening or clamp elements. The particular clamp elements are selected according to the type of structure desired to be made from the plurality of panels, or the orientation of the panels. Panels may be made of various sizes, depending on the end use, but the general size of the panel elements may be the same, and accordingly the various fastening elements are suitable for panels regardless of the overall size of the panels.

7 Claims, 3 Drawing Sheets

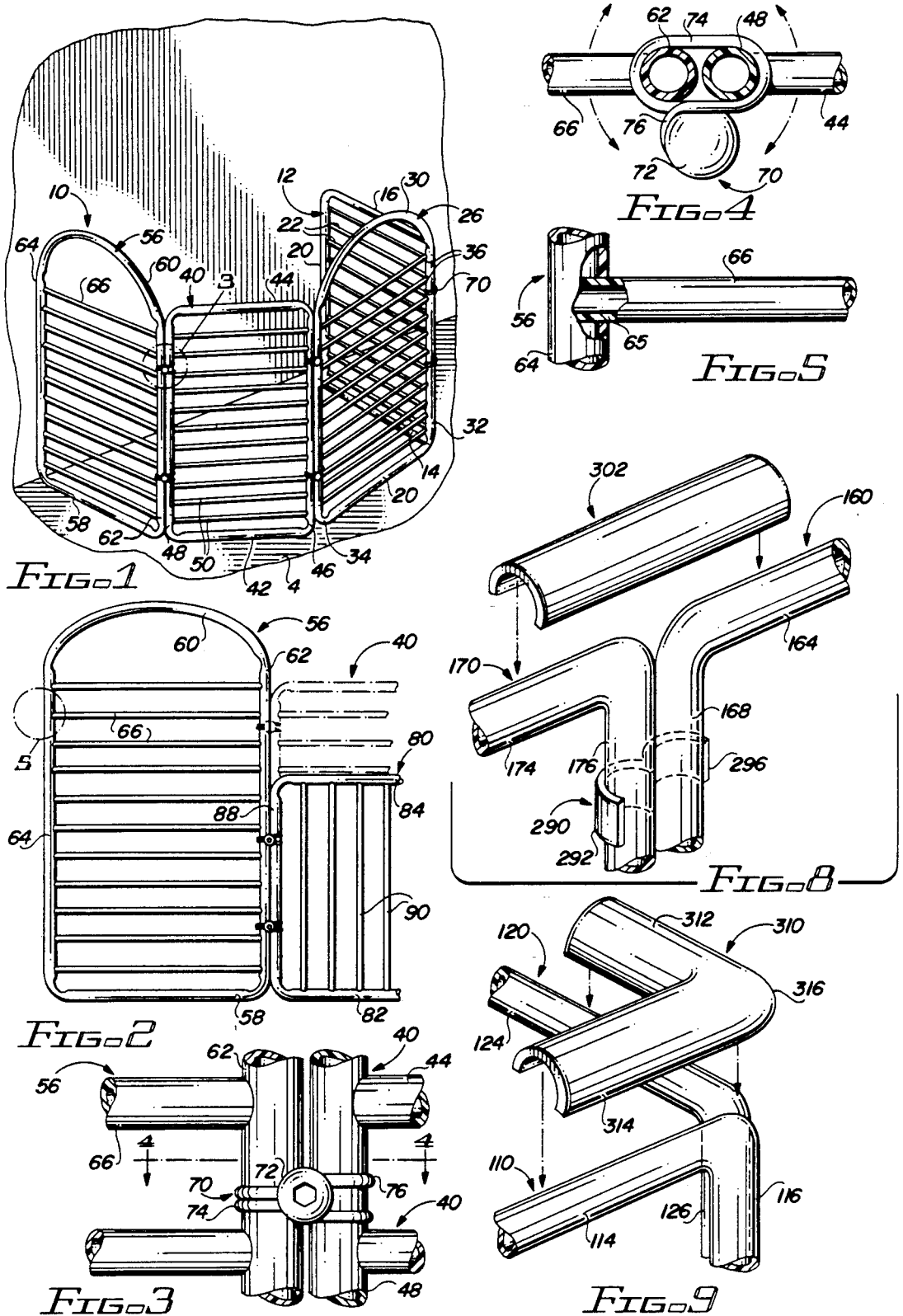

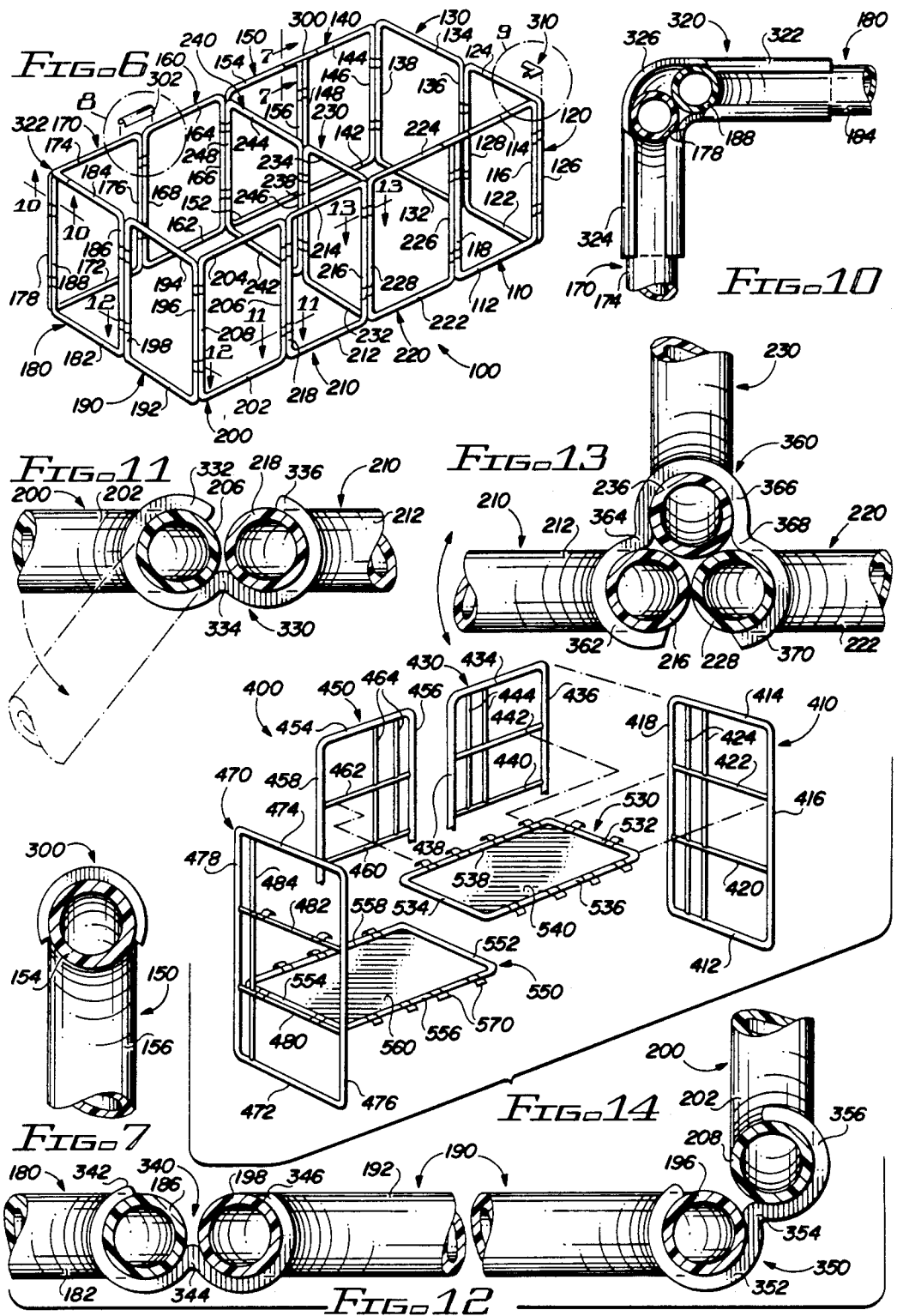

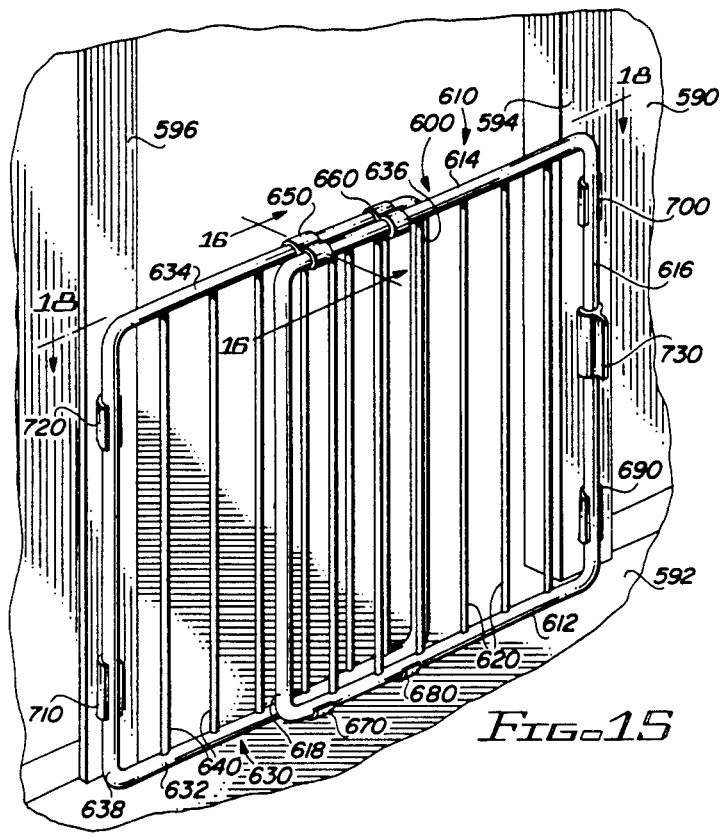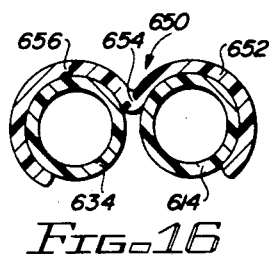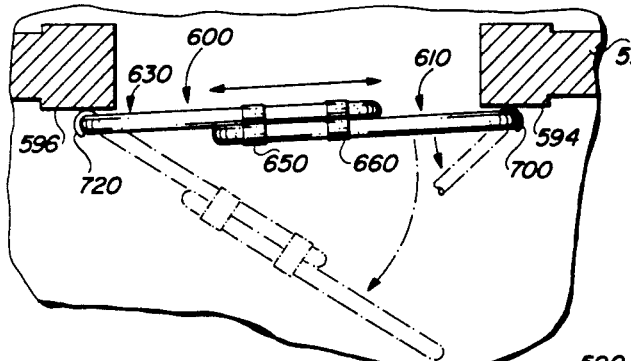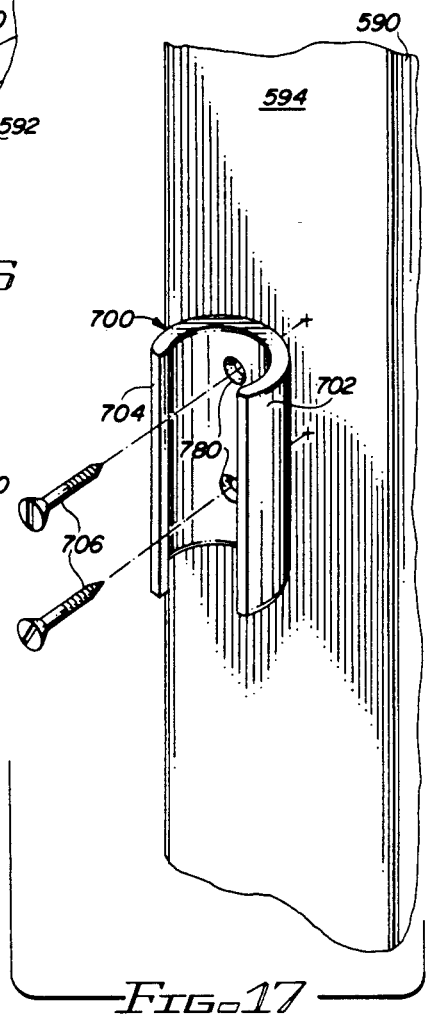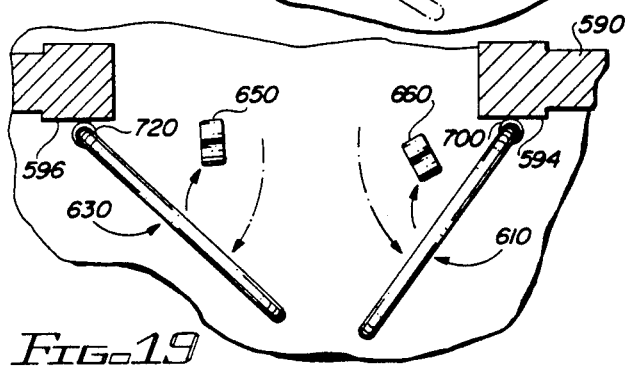

PANEL APPARATUS AND ELEMENTS FOR SECURING A PLURALITY OF PANELS TOGETHER

CROSS REFERENCE TO RELATED APPLICATION

This application is a Continuation-In-Part application of Ser. No. 07/245,015, filed Sept. 15, 1988, now abandoned.

BACKGROUND OF THE INVENTION

1. Field of the Invention

This invention relates to panel elements and, more particularly, to panel elements which may be secured together to comprise various types of structures, such as enclosures for pets, a playing area for a small child, a gate for preventing children and/or pets from straying from a particular room or area, and the like.

2. Description of the Prior Art

Prior art structures of the same general type or for the same general purposes are generally permanent fixtures or elements relatively, permanently secured together or assembled to define a playpen, enclosure, and the like. Such elements are, of course, relatively unwieldy when being transported from one location to another, and, with their fixed size, they are not easily adaptable to changing conditions, etc.

The apparatus of the present invention overcomes the problems of the prior art by providing a plurality of panels which may be assembled together to define virtually any type of structure desired by a user. The panels are lightweight, the fastening elements which secure the panels together are easily installed and easily removed, and the apparatus is thus easily transported. Moreover, the fastening elements used to secure adjacent panels together allows the panels to be folded together in an accordion-like manner.

SUMMARY OF THE INVENTION

The invention described and claimed herein comprises panels which may be secured together to provide various types of structures as desired by a user. The elements which secure the panels together are of several types, depending on the particular structural entity desired by the user. The fastening elements or clamps are easily assembled to the panels and are relatively easily removed from the panels, but, when assembled to the panels, comprise relatively strong fastening elements so that a particular type of enclosure or unit desired by a user may be relatively secure in the assembled condition or state.

Among the objects of the present invention are the following:

To provide new and useful panel apparatus;

To provide new and useful panel apparatus utilizing a plurality of panels secured together;

To provide new and useful fastening elements for securing together a plurality of panels;

To provide a plurality of fastening elements to secure together panels in desired configurations;

To provide new and useful panel apparatus including a plurality of generally identical panels secured together to define enclosures in which children and animals may be kept; and To provide new and useful enclosure apparatus including a plurality of generally identical panels secured together by fastening elements and which fastening elements are relatively easily installed and relatively easily removed from the panels.

BRIEF DESCRIPTION OF THE DRAWING

FIG. 1 is a perspective view of an embodiment of the apparatus of the present invention.

FIG. 2 is a side elevational view of a portion of an embodiment of the apparatus of the present invention.

FIG. 3 is an enlarged view of a portion of the apparatus of FIG. 2 taken generally from Circle 3 of FIG. 1.

FIG. 4 is a view in partial section taken generally from line 4—4 of FIG. 3.

FIG. 5 is an enlarged view, in partial section, taken generally from Circle 5 of FIG. 2.

FIG. 6 is a perspective view of an alternate embodiment of the apparatus of the present invention.

FIG. 7 is an enlarged view in partial section taken generally along line 7—7 of FIG. 6.

FIG. 8 is an enlarged view taken generally from Circle 8 of FIG. 6.

FIG. 9 is an enlarged view taken generally from Circle 9 of FIG. 6.

FIG. 10 is a view in partial section taken generally along line 10—10 of FIG. 6.

FIG. 11 is an enlarged view in partial section taken generally along line 11—11 of FIG. 6.

FIG. 12 is an enlarged view in partial section taken generally along line 12—12 of FIG. 6.

FIG. 13 is an enlarged view in partial section taken generally along line 13—13 of FIG. 6.

FIG. 14 is an exploded perspective view of an alternate embodiment of the apparatus of the present invention.

FIG. 15 is a perspective view of another alternate embodiment of the apparatus of the present invention.

FIG. 16 is a view in partial section taken generally along line 16—16 of FIG. 15.

FIG. 17 is a perspective view of a portion of the apparatus of FIG. 15.

FIG. 18 is a top view taken generally along line 18—18 of FIG. 15.

FIG. 19 is a top view illustrating an alternate operation of the apparatus of FIG. 15.

DESCRIPTION OF THE PREFERRED EMBODIMENT

FIG. 1 is a perspective view of panel apparatus 10 of the present invention comprising of an enclosure made of four panels. The four panels include a panel 12, a panel 26, a panel 40, and a panel 56. The four panels 12 ... 56 are disposed against a wall 2 and disposed on a floor 4.

FIG. 2 is an enlarged elevational view of the panel 56 and a portion of a panel 80 disposed in a generally aligned orientation. FIG. 3 is an enlarged view of a portion of the panels 40 and 56 taken generally from circle 3 of FIG. 1, illustrating the connecting or securing together of two panels. FIG. 4 is a view in partial section of the panels 40 and 56 taken generally along a line 4—4 of FIG. 3, and illustrating details of the connecting together of the two panels. FIG. 5 is an enlarged view of a portion of the panel 56 taken generally from circle 5 of FIG. 2. FIG. 5 illustrates a typical manner of joining horizontal and vertical members of the panels in the apparatus 10. For the following discussion, reference will generally be made to FIGS. 1, 2, 3, 4, and 5. Particular features will be discussed with direct reference to a specific figure.

The panel apparatus 10 comprises an enclosure made of four panels, each of which panels are movable relative to adjacent panels. If desired, of course, more panels could be secured together to define a larger enclosure or an enclosure of a different size, different configuration, etc. However, for illustrative purposes, four panels, panels 12, 26, 40, and 56 are illustrated in FIG. 1. It will be noted that panels 12 and 40 are of generally the same configuration, and panels 26 and 56 are of generally the same configuration.

Panel 12 includes a bottom horizontally extending over frame member 14 and a top horizontally extending over frame member 16.

The panel 12 also includes a pair of side vertically extending frame members which are appropriately secured to the top and bottom members. One of the side members, a side member 20, is illustrated in FIG. 1. Extending between the side frame members is a plurality of horizontally extending frame members 22. The horizontally extending frame members 22 extend into apertures in the vertically extending side members, as will discussed below. The top and bottom horizontal frame members and the vertically extending side frame members are appropriately secured together.

The panel 26 includes a bottom horizontal extending member frame 28 and a curved top frame member 30. The panel 26 also includes a pair of spaced apart side vertically extending frame members 32 and 34. A plurality of horizontally extending members 36 extend between, and are appropriately secured to, the side frame member 32 and 34.

The panel 40 is substantially identical to the panel 12. It includes a bottom horizontally extending frame member 42, a top horizontally extending frame member 46, and a pair of vertically extending side frame members 46 and 48. The side frame members are appropriately secured to the top and bottom frame members. A plurality of horizontally extending cross members 50 extends between, and is appropriately secured to, the side members 46 and 48.

The panel 56 is substantially identical to the panel 26. It includes a bottom horizontally extending frame member 58, a curved top frame member 60 and a pair of vertically extending side frame members 62 and 64. The side member 62 and 64 are appropriately secured to the bottom horizontally extending member 58 and to the curved top member 60. A plurality of horizontally extending cross members 66 extends between the side member 62 and 64 and is appropriately secured thereto.

In FIG. 2, a panel, such as the panel 56, is shown secured to a panel 80. The panel 80 includes vertically extending members rather than horizontally extending members.

The panel 80 includes a bottom horizontally extending outer frame member 82 and a top horizontally extending outer frame member 84. A side vertically extending outer frame member 88 is shown secured to the bottom and top frame members. A plurality of vertically extending members 90 is disposed between and is appropriately secured to the bottom and top frame members 82 and 84, respectively. The members 90 are secured to the members 82 and 84 in substantially the same manner as illustrated in FIG. 5 for the horizontally extending cross members and their vertically extending frame members, namely extending into apertures in the frame members.

The panel 80 is different from the panels 12, 26, 40, and 56 primarily in that its inner members are horizontal, rather than vertical, as has been pointed out. However, the panel 40 is also shown in FIG. 2 in phantom. Thus, different types of panels may be secured together, as desired.

FIG. 3 is an enlarged view of a portion of the panels 40 and 56 illustrating how they are secured together. In FIG. 3, a portion of the vertically extending frame members 48 and 62 of the panels 40 and 56, respectively, are shown disposed adjacent to each other. A fastening element 70 is shown disposed about the vertical side members 48 and 62 and between an adjacent pair of the horizontally extending cross members 44 and 66 of the panels 40 and 56, respectively.

The fastening element 70 includes a ball 72 to which is secured an elastic cord 74 in the form of a loop. The cord 74 is disposed about the vertical members 62 and 48, and an outer end 76 of the cord 74, remote from where the cord is originally secured to the ball 72, is looped about the ball to secure the two panels together. The end 76 simply comprises an end loop snubbed around the ball 72 so that the cord 74 is both fixedly and removably secured to the ball 72.

FIG. 4 is a top view of the fastening element 70 taken generally along line 4—4 of FIG. 3. The ball 70 is illustrated, with the elastic cord 74 extending about the vertical members 62 and 48 and the end 76 of the cord 74 is shown looped back around the ball 70.

It will be understood that, since the elastic cord 74 is flexible, the panels may be moved relative to each other, with the pivot point for the panels located between the vertical members 48 and 62. Thus, using, for example, a pair of fastener elements 70 for each adjacent panel, as shown in FIG. 1, the panels may be oriented at any desired angle with respect to each other. Moreover, the use of such flexible elements allows the panels to be literally folded on top of each other for storage and for transport purposes. The folding occurs in an end to end manner in what is typically referred to as a fan fold or accordion configuration or manner.

FIG. 5 is a view in partial section of a portion of the apparatus of FIG. 2, taken generally from Circle 5 of FIG. 2. FIG. 5 illustrates how the horizontal cross members are secured to the vertical outer frame members. It will also be noted that vertical member 1 may be secured to horizontal outer frame members in the same manner.

In FIG. 5, the vertical outer frame member 64 is shown as a hollow or cylindrical or tubular member. An aperture 65 extends through the wall of the member. ONe end of the cross member 66 extends into the aperture 65 and is appropriately secured therein.

FIG. 6 is a perspective view of an alternate embodiment of the panel apparatus 10 of FIG. 1. FIG. 6 comprises a perspective view of a plurality of generally rectangularly configured panels secured together to form a double pen or enclosure apparatus 100. Obviously, as many panels as desired may be appropriately secured together, as will be discussed in detail below, to provide enclosures of different sizes, different configurations, etc. The enclosures may be secured together in a continuous line, or continuously adjacent to each other, such as illustrated in FIG. 6, or they may be separated, as desired.

The panels illustrated in FIG. 6 are substantially identical to each other, and each includes a bottom horizontally extending outer frame member, a top horizontally extending outer frame member, and a pair of vertically extending outer side frame members. The four frame members are appropriately secured together. The panels also include a plurality of vertically extending members, similar to the vertically extending members of the panel 80 of FIG. 2, as discussed above. However, for clarity, the vertically extending members have been omitted in FIG. 6.

A plurality of connectors or connector elements are used to secure adjacent panels together. Some of the connector elements are shown in FIG. 6 and are illustrated in more detail in other figures, as will be discussed below. However, and again for clarity, many of the connector elements have been omitted from FIG. 6. The different types of connector elements are illustrated in FIGS. 7, 8, 9, 10, 11, 12, 13, and will be discussed in conjunction with those figures, below.

Enclosure apparatus 100 is comprised of fourteen panels, including a panel 110, a panel 120, a panel 130, a panel 140, a panel 150, a panel 160, a panel 170, a panel 180, a panel 190, a panel 200, a panel 210, a panel 220, a panel 230, and a panel 240. There are twelve perimeter panels and two interior or partition panels.

The enclosure apparatus 100 includes, essentially, a pair of square enclosures with a common wall between them. Each wall of the enclosures includes two panels, with all of the panels 110 . . . 240 being substantially identical to each other.

The panel 110 includes a bottom frame element 112, a top frame element 114, and a pair of side frame elements 116 and 118. The four elements are appropriately secured together and comprise the outer frame for the panel 110.

The panel 120 includes a bottom frame member 122, a top frame member 124, and a pair of side frame members 126 and 128. The four frame members are appropriately secured together.

The panel 130 includes a bottom frame member 132, a top frame member 134, and a pair of side frame members 136 and 138. Again, the four frame members are appropriately secured together.

The panel 140 includes a bottom frame member 142, a top frame member 144, and a pair of side frame members 146 and 148. The frame members are likewise appropriately secured together.

The panel 150 includes a bottom frame member 152, a top frame member 154 and a pair of side frame members 156 and 158. Again, the four frame members are appropriately secured together.

The panel 160 includes a bottom frame member 162, a top frame member 164 and a pair of side frame members 166 and 168. The panel 170 includes a bottom frame member 172, a top frame member 174 and a pair of side frame members 176 and 178. The panel 180 includes a bottom frame member 182, a top frame member 184 and a pair of side frame members 186 and 188. The panel 190 includes a bottom frame member 192, a top frame member 194 and a pair of side frame members 196 and 198. As before, the four frame members of each of the panels are appropriately secured together to define or comprise the outer frames for the respective panels.

The panels 200, 210, 220, 230, and 240 each includes bottom frame members 202, 212, 222, 232, and 242, respectively, and top frame members 204, 214, 224, 234, and 244, respectively. The panel members 200 . . . 240 also include pairs of side frame members 206 and 208, 216 and 218, 226 and 228, 236 and 238, and 246 and 248, respectively. As with the other panels, the four frame members of each panel are appropriately secured together.

As indicated above, the vertically extending frame members that extend between and are secured to the horizontally extending bottom and top outer frame members have been omitted for clarity in FIG. 6.

For securing the panels together at various locations, different types of fastening elements are used. A straight stabilizer clamp 300 is shown in FIG. 7. FIG. 7 is an enlarged view in partial section taken generally along line 7—7 of FIG. 6. In FIG. 7, the straight stabilizer clamp 300 is shown in an end view with the clamp 300 disposed on the top horizontally extended frame member 154 and above the vertically extending side frame member 156 of the panel 150. In FIG. 1, the clamp 300 is shown joining the panels 140 and 150.

The clamp 300 is a relatively straight clamp which extends arcuately for a distance greater than 180 degrees. The inner diameter of the clamp 300 is about the same as the outer diameter of the frame members 154 and 144 of the panels of 150 and 140, respectively, and the inherent flexibility of clamp 300 allows the clamp to be placed on the horizontally extending frame members at the juncture of the two panels. In this manner, the two panels 140 and 150 are held together. The clamp 300 may require a relieved portion adjacent to the vertical frame members 148 and 156.

FIG. 8 is an enlarged perspective view of a straight stabilizer clamp 302, which is essentially identical to the straight stabilizer clamp 300. The clamp 302 is shown spaced apart from the adjacent and aligned top horizontally extending frame members 164 and 174 of the panels 160 and 170, respectively. The vertically extending side frame members 168 and 176 of the panels 160 and 170 are also shown in FIG. 8. Again, the clamp 302 is disposed on both the frame members 164 and 174, overlying each about the same amount for stabilizing the frame members 164 and 174, and thus the panels 160 and 170, in a generally aligned orientation.

A clamp 290 is also shown in FIG. 8. The clamp 290 include simply a pair of partial loops 292 and 296 connected together by an intermediate web. Each loop extends arcuately slightly more than one hundred eighty degrees. The inner diameter of the loops is substantially the same as the outer diameter of the frame members 168 and 176 to which the clamp 290 is secured. The inherent flexibility of the material out of which the clamp 290 is made allows the loops to expand or flex as the loops are fitted over the frame members. This flexibility is, of course, inherent in all of the clamps discussed herein.

FIG. 9 is a perspective view taken generally from Circle 9 of FIG. 6. It illustrates the use of a corner stabilizer clamp 320. The corner stabilizer clamp 320 is shown spaced apart from the adjacent portions of the panels 110 and 120. The top horizontally extending frame member 114 of the panel 110 is shown disposed beneath an arm 314 of the clamp 310. The top horizontally extending frame member 124 of the panel 120 is shown beneath an arm 312 of the clamp 310. The vertically extending frame members 116 and 126 of the panels 110 and 120, respectfully, are disposed beneath an elbow or juncture 316 of the clamp 310.

As with the clamps 300 and 302, and the clamp 290, discussed above, the legs 312 and 314 of the clamp 310 extend arcuately for a distance slightly greater than 180 degrees. Moreover, the clamp 310 is flexible in that the legs 312 and 314 will expand outwardly so that the legs may be positioned appropriately on the horizontally extending frame members 114 and 124. When the clamp 310 is placed on the frame members 114 and 124, the legs 312 and 314 will be appropriately disposed on the top horizontal frame members 124 and 114, respectively, with sufficient overlap, or an arcuate extent of greater than 180 degrees, to secure the panels 110 and 120 together.

The elbow or junction 316 is appropriately configured to also be disposed over the top portions of the vertical frame members 116 and 126, or over the junctures of the vertical frame members and the horizontal frame members of the respective panels.

FIG. 10 is a view in partial section of the adjacent panels 170 and 180, taken generally along line 10—10 of FIG. 6. The view illustrated in FIG. 10 is upwardly through the vertical frame members 178 and 188 of the panels 170 and 180, respectively, and towards the top horizontally extending frame members 174 and 184 of the respective panels. A clamp 320, which is a corner stabilizer clamp substantially identical to the corner stabilizer clamp 310 of FIG. 9, is shown disposed over the horizontally extending frame members 174 and 184.

The corner clamp 320 includes a pair legs 322 and 324 disposed substantially perpendicularly to each other. An elbow or juncture 326 connects the two legs 322 and 324.

The legs 322 and 324 are shown extending arcuately on the frame members 174 and 184 for an arcuate distance of slightly greater than 180 degrees. However, the elbow or juncture 326 does not so extend since it must overlie the vertically extending frame members 178 and 188.

FIG. 11 is a view in partial section taken generally along line 11—11 of FIG. 6, illustrating a clamp 330, which may be referred to as an M-Clamp, which secures together the vertically extending frame members 208 and 218 of the panels 200 and 210, respectively, to secure the two panels together.

The M-Clamp 330 may be considered as including a pair of partial loops, including a partial major loop 332 and a partial minor loop 336, with the partial loops secured together by a connecting web 334. The major partial loops 332 extends for an arcuate distance of about 270 degrees, and the minor partial loop 336 extends for an arcuate distance of slightly greater than 180 degrees. The arcuate distance for the two partial loops may be measured from the connecting web 334.

As with the clamps discussed above, the M-Clamp 330 is made of material which is flexible enough so that the loops may be spread out sufficiently to receive, or be disposed about, the frame members to which they are secured and which they will join together or secure together. The inner diameter of the loops, like the inner diameter legs of the clamps 300, 310, and 320, discussed above, is substantially the same of the outer diameter of the frame members about which they are disposed.

The major loop portion 332 is first disposed about the vertical frame member 206 of the panel 200, and then the minor loop portion 336 is disposed about the frame member 218 of the panel 210. It is obviously much easier to secure the minor loop portion 336 about the frame member 218 than it is to secure the major loop portion 332 about the frame member 206. This is so because the loop portion 332 extends arcuately for a greater distance than does the loop portion 336. Accordingly, the loop portion 332, or the major loop portion, is placed on its frame member first, and then the clamp 330 is moved or pivoted on the frame member 206 to bring the loop portion 336 against vertical frame member 218.

The vertical frame members 206 and 218, when secured together by the clamp 330, are disposed adjacent to each other. The spacing apart of the frame members 206 and 218 is in accordance with the distance between, or the spacing between, the loop portions 332 and 336, which is essentially a function of the length or size of the connecting web 334.

In FIG. 11, the panel 200 is shown in dotted line moving away from its solid line position. This illustrates the fact that the clamp 330 may be considered as a hinge to allow relative movement between the two panels 200 and 210. In other words, the panels 200 and 210 may be oriented at other than a linear orientation, as shown in FIG. 6 and also in the solid line portion of FIG. 6, if desired. Moreover, the panels 200 and 210 may be moved relative to each other so as to define a gate, as it were, with one panel utilizing clamps such as clamp 330.

In FIG. 12, a pair of M-Clamps 340 and 350 are shown securing together three adjacent panels, the panel 180, the panel 190 and the panel 200. FIG. 12 is a veiw in partial section through the vertical members 186, 198, 196, and 208 of the panels 180, 190, and 200, respectively. The M-Clamps 340 and 350 are substantially identical to the M-Clamp 330 discussed above. The M-Clamp 340 includes two partial loops, a major partial loop or loop portion 342 and a minor partial loop or loop portion 346. The clamp 350 similarly includes two partial loop portion, a major partial loop portion 352 and a minor partial loop portion 356. A connecting web 344 is disposed between the loop portions 342 and 346, and a connecting web 354 is disposed between and connects the loop portion 352 and 356.

The clamp 340 is used, with another similar clamp, to secure the panel 180 to the panel 190. The clamp 350 acts as a corner clamp to secure the panel 190 to the panel 200. It will be noted that the panel 200 is disposed substantially perpendicularly to the panel 190. However, as discussed above in conjunction with FIG. 11, it is obvious that the panel 200 could be disposed at any desired angle with respect to the panel 190.

FIG. 13 is a view in partial section taken generally along line 13—13 of FIG. 6, illustrating the use of a three way clamp 360 used to secure together two aligned panels, the panels 210 and 220, to a third panel, the panel 230. The panel 230 is disposed substantially perpendicularly to the aligned panels 210 and 220. The panel 230 is one of the two intermediate panels or partition panels that separate the two pens of the apparatus 100. The first pen may be considered as including the panels 110, 120, 130, 140, 150, 240, 230, and 220, while the second pen or enclosure may include the panels 160, 170, 180, 190, 200, 210, and 230 and 240.

The three way clamp 360 includes three partial loops, a major partial loop 362, a rear partial loop 366, and a minor partial loop 370. The three partial loops are connected together by connecting webs, with a connecting web 364 disposed between the loop portions 362 and 366 and connecting web 368 disposed between the loop portions 366 and 370.

As is relative clearly shown in FIG. 13, the rear loop 366 extends arcuately for a distance greater than 180 degrees. The major loop 362 extends arcuately of a distance slightly greater than 180 degrees, and the minor loop portion 370 extends arcuately for a distance of about 180 degrees, or slightly less. In securing the clamp 360 to the three frame members 216, 236, and 226, the rear loop portion 366 is first placed on the frame member 236, and then the loop portion 362 is placed on the frame member 216. Finally, the loop portion 370 is placed on the frame member 228. Again, the material out of which the clamp 360 is made has sufficient flexibility to allow the loop portions to spread a sufficient distance to allow the loop portions to be placed over their respective frame members which they secure together.

While the panels 210, and 220 are shown aligned with each other, and the panel 230 is shown disposed substantially perpendicularly to the panels 210 and 220, it is obvious that the three panels may be disposed at any desired angular orientation with respect to each other. The limiting factor is, of course, that the frame members 216, 228, and 236, to which the clamp 360 is secured, must be disposed adjacent to each other.

FIG. 14 is an exploded perspective view of another alternate embodiment of the apparatus of the present invention, in which a plurality of panels are connected together to form a multi level enclosure, or the like. A multi-tier panel apparatus 400 is illustrated in FIG. 14 as including an end panel 410, an end panel 470, and side panels extending between and secured to the end panels 410 and 470. Two side panels, a side panel 430 and a side panel 450, are shown in FIG. 14. Two other side panels, generally parallel to the panels 430 and 450, have been omitted for clarity.

The panel 410 comprises as an end panel for the apparatus 400. The panel 410 includes a bottom horizontally extending frame member 412, a top horizontally extending frame member 414, and a pair of vertically extending side frame members 416 and 418. The four outer frame members 412, 414, 416, and 418 are appropriately secured together.

A pair of generally horizontally extending cross reinforcing members extend between these side frame elements 416 and 418. The reinforcing members include a lower cross member 420 and a upper cross member 422. A plurality of vertically extending elements 424 extend between are appropriately secured to, the lower and upper frame members 412 and 414, and they extend through apertures or holes in the cross members 420 and 422. The cross members 420 and 422 provide reinforcement for the vertical members 424.

For clarity, only two inner vertical members 424 are shown for the panel 410. Similarly, for the panels 430, 450, and 470, only one or two inner vertical members are shown.

The panel 430 is substantially identical to the panel 410. The panel 430 includes a bottom horizontally extending over frame member, not shown, and a top horizontally extending outer frame member 434, and a pair of vertically extending outer side frame members 436 and 438. The outer frame members are, of course, appropriately secured together. Extending between the vertical side members 436 and 438 are reinforcing cross members, including a lower cross member 440 and a upper cross member 442. A plurality of inner vertical elements 444 extend between the bottom frame member and the top frame member 434, and extend through the reinforcing cross members 440 and 442. The vertical elements 444, like the vertical elements 424, are appropriately secured to the bottom and top outer frame members.

The panel 450, the second side panel for the apparatus 400, is substantially identical to the panels 410 and 430. The panel 450 includes a bottom horizontally extending frame member, not shown, a top horizontally extending frame member 454, and a pair of vertically extending side frame members 456 and 458. The bottom frame member, the top frame member 454 and the side frame member 456 and 458 define an outer frame for the panel 450. A pair of horizontally extending reinforcing frame members 460 and 462 extend between and are appropriately secured to the frame members 456 and 458. A plurality of vertically extending members 464 extend between the bottom and top frame members to which they are appropriately secured, and through the cross members 460 and 462.

The panels 430 and 450 are aligned with each other, and are appropriately secured together using clamps similar to the clamps 330, 340 and 350 discussed above in conjunction with FIGS. 11 and 12, or a plurality of clamps such as the clamp 290 of FIG. 8, and a top clamp, such as the clamp 302 of FIGS. 6 and 8. The end panel 410 is similarly appropriately secured to the side panel 430 by a plurality of appropriate clamps.

The end panel 470 is disposed generally parallel to the end 410. The end panel 470 includes a bottom horizontally extending outer frame member 472 and a top horizontally extending outer frame member 474. A pair of vertically extending outer side frame members 476 and 478 are appropriately secured to the bottom and top frame members 472 and 474, respectively. A pair of reinforcing cross members, including a lower cross member 480 and a upper cross member 482, extend between and are appropriately secured to the outer side frame members 476 and 478. A plurality of vertical members 484 extend between and are secured to the frame members 472 and 474 and they extend through the cross members 480 and 482.

The end panel 470 is similarly secured to the side panel 450 using appropriate clamps, as discussed above.

Another pair of side panels, not shown, is disposed generally parallel to the side panels 430 and 450, and the panels are appropriately secured together and are appropriately secured to the end panels 410 and 470, all as discussed above.

Two tiers, an upper tier 530 and a lower tier 550, are secured to the six panels which comprise a frame for the multi tier panel apparatus 400. The upper tier 530 includes four outer frame members which are substantially identical to the outer frame members of the panels 410 . . . 470 and which are appropriately secured together. The frame members include a pair of end frame members 532 and 534 and a pair of side frame members 536 and 538. A plate 540 is appropriately secured within the frame defined by the four outer frame members. The plate 540 is preferably a relatively solid plate, made of an appropriate, relatively light weight material, such as pvc or the like. Similarly, the various frame members of the various embodiments of the apparatus discussed herein are preferably made of pvc pipe or the like. Obviously, the frame elements are appropriately configured for mating engagements, etc.

The lower tier 550 is substantially identical to the upper tier 530. The tier 550 includes four outer frame members, including a pair of end frame members 552 and 554 appropriately secured to a pair of side frame members, a side frame member 556 and a side frame member 558. A plate 560 is appropriately secured to and disposed within the rectangularly configured outer frame members 552, 554, 556, and 558.

A plurality of appropriate clamps 570 are used to secure the tiers 530 and 550 to the panels 410 . . . 470, and the other two side panels, not show. The clamps for the tiers 530 and 550 extend over the outer frame members of the tiers and onto the reinforcing cross members. Thus, the lower tier 550 is secured to the lower reinforcing cross members 420, 440, 460, and 480, and the upper tier 530 is secured to the upper reinforcing 422, 442, 462, and 482. The tiers are similarly secured to cross members for the other two side panels, not shown.

While the tier panels 530 and 550 are shown as intermediate tiers, it is obvious that they may also be used as floor panels and as roof panels, if desired. Thus, a closed enclosure or the like may be fabricated from the different types of panels, using a panel with a solid plate for a floor and either a solid plate panel for a roof panel or a panel with a plurality of spaced apart interior frame members for the top or roof panel. A door panel may be made using clamps such as the clamps 330, 340, or 350 as hinges.

FIG. 15 is a perspective view of a pair of panels 610 and 630 secured together to comprise a gate panel assembly 600. The gate assembly 600 is shown in FIG. 15 disposed across a doorway extending a wall 590. The wall 590 is shown extending upwardly from a floor 592. The doorway includes a side door frame member 594 and a side door frame member 596. The gate assembly 600 is appropriately secured to the door frame members or stiles 594 and 596.

The panel 610 includes a bottom horizontally extending outer frame member 612 and a top horizontally extending outer frame member 614. Extending between, and appropriately secured to, the frame members 612 and 614, is a pair of side outer frame members 616 and 618. A plurality of vertically extending inner or interior members 620 extend between, and are secured to, the frame members 612 and 614.

The panel 630 is substantially identical to the panel 610. The panel 630 includes a bottom horizontally extending frame member 632 and a top horizontally extending frame member 634. A pair of vertical extending side frame members 636 and 638 extend between and are appropriately secured to the bottom and top frame members 632 and 634, respectively. A plurality of vertically extending interior member 640 extend between and are appropriately secured to the frame members 632 and 634.

The structure of the panels 610 and 630, is, as indicated, substantially identical. Moreover, the general structure of the panels 610 and 630 is substantially identical to the panels discussed above in conjunction with the other embodiments of the present invention in that the panels of made of outer frame members with interior members, either vertical or horizontal, as desired, or as appropriately oriented, extending between a pair of the outer frame members. In FIG. 15, the panels 610 and 630 appear to be generally square in configuration, but they made be rectangular, or otherwise.

The panels 610 and 630 are secured together at their top and bottom portions by top clamps. A pair of top clamps 650 and 660 are shown in FIG. 15 securing the tops of the panels 610 and 630 together. Another pair of clamps 670 and 680 are shown securing the bottoms of the panels together. The clamps 650, 660, 670, and 680 are substantially identical to each other.

FIG. 16 is a view in partial section, taken generally along line 16—16 of FIG. 15, through the top clamp 650 and the adjacent top horizontally extending frame members 614 and 634. The clamp 650 is shown in a cross sectional configuration in FIG. 16.

The clamp 650 includes a pair of partial loops secured together by a center web. A partial loop 650 and a partial 656 are joined together by a web 654. The partial loops 652 and 656 extend arcuately from the connecting web 654 for a distance of slightly greater than 180 degrees. The partial loops of the clamp 650 do not extend arcuately as far as do the partial loops of the M-Clamps discussed above in conjunction with FIGS. 11 and 12.

The panel 610 and 630 are disposed adjacent to each other in an overlapping manner, as shown in FIG. 15. Thus, their combined length may be as desired, as long as the overlapping portion is sufficient to give the desired strength or rigidity to the combined gate panel assembly 600.

The over ends of the panels 610 and 634, which comprise the outer sides of the combined panel assembly 600, namely the frame members 616 and 638, remove from the overlapping portion of the panels, are appropriately secured to the door frame stiles 594 and 596 by wall clamps. FIG. 17 is an enlarged perspective view of a portion of the apparatus of FIG. 15 illustrating a wall clamp 700. In FIG. 17, the wall clamp 700 is shown secured to the door frame or stile 594. The wall clamp 700 comprises a generally cylindrical element 702 with a longitudinally extending slot 704 extending for an arcuate width somewhat less than 180 degrees. The arcuate length or extent of the cylindrical element 702 is greater than 180 degrees, thus nesting or receiving the vertical side member 616 and holding it relatively securely. The element 702 is secured to the stile 594 by a pair of appropriate fastening elements, such as screw 706. The screws 706 are shown disposed outwardly from a pair of holes or apertures 708 which extend through the cylindrical portion 702.

As with the other clamp elements of the apparatus of the present invention, the clamp element 700 is made of material which is flexible enough so that the portions of the cylindrical element 702 adjacent to the slot 704 will expand to receive the side frame element or member 616. The normal inner diameter of the element 702 is substantially the same as the outer diameter of the side frame member 616, and thus once the frame member 616 is disposed within the clamp 700, the element will be held therein relatively securely.

With a pair of wall clamps 690 and 700 spaced apart from each other, but appropriately aligned on the door frame or stile 594, and a similar pair of wall clamps 710 and 720 secured to the door frame or stile 596, the gate 600 may be securely held across the doorway to prevent to undesired intrusion as by pets, infants, etc. On the other hand, the gate apparatus 600 may also be relatively easily opened or pivoted from either stile, as desired.

In FIG. 15, a handle element 730 is shown secured to the frame member 616. The handle element 730 may also include a cylindrical element, such as the element 702, with an outwardly extending flange, or the like, remote from the slot which receives the frame member 616. Or, if desired, the handle 730 may be permanently affixed to the frame element 616. Obviously, the holding power of the handle element 730 with respect to the vertical frame member 616 should be greater than the combined holding power of the clamps 690 and 700 so that the gate panel 610 and 630 will be freed from the wall clamp 690 and 700 as an outward pull on the handle 730 is effected.

FIG. 18 is a top view illustrating the pivoting of the gate apparatus 600 on the door frame member 596, with the gate panels 610 and 630 secured together.

As the frame member 616 is freed from the clamp 690 and 700, the combined panel 610 and 630 comprising the gate 600 pivot on the wall clamp 710 and 720 in which the vertical frame member 638 of the panel 630 is disposed. Obviously, and if desired, the wall clamp 690 and 700 could be used as the pivot elements or hinges.

FIG. 19 is a similar top view, but with the top clamps 650 and 660 removed from the panel 610 and 630 so that the panels 610 and 630 may pivot in their wall clamps on their respective door frames 594 and 596. Thus, with the top and bottom clamps 650, 660, and 670, 680 removed from the panels, the panels are free to pivot on the wall clamps, with the wall clamps acting as hinges. The panel 610 and 630 may accordingly comprise a double gate for the doorway.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Panel apparatus, comprising, on combination:
   panel means, including
      a plurality of panels, each of which includes an outer frame having a pair of side frame members and a top and a bottom frame member, and a plurality of inner members secured to the outer frame; and
   clamp means for securing the plurality of panels together, including
      top clamp means removable secured to adjacent top frame members, and
      side clamp means removable secured to adjacent side frame members, and
      at least one of the top clamp means and the side clamp means includes a major loop extending for an arcuate distance of about 270 degrees and a minor loop adjacent to the major loop and eextending for an arcuate distance of slightly more than about 180 degrees.

2. The apparatus of claim 1 in which the top clamp means includes a corner stabilizer clamp having a first leg secured to a top frame member of one panel and a second leg secured to a top frame member of an adjacent panel disposed at an angular orientation other than aligned with or parallel to the one panel.

3. The apparatus of claim 1 in which the top clamp means includes a straight stabilizer disposed on a pair of adjacent and aligned top frame members.

4. The apparatus of claim 1 in which the top clamp means includes an M-clamp having a first partial loop disposed on a first top frame member of a first panel and a second partial loop disposed on a second top frame member of a second panel disposed adjacent and generally parallel to the first panel.

5. The apparatus of claim 1 in which the side clamp means includes
   a ball
   an elastic loop secured to the ball and disposed about a pair of adjacent side frame members, and
   an end loop on the elastic loop remote from the ball disposed over the ball to secured the pair of adjacent side frame members together.

6. The apparatus of claim 1 in which the side clamp means includes a M-clamp having a major loop disposed over a first side frame member of a first panel and a minor loop disposed over a second side frame member of a second panel.

7. The apparatus of claim 1 in which the side clamp means includes a three-way clamp having
   a major loop for receiving a first side frame member of a first panel,
   a rear loop for receiving a second side frame member of a second panel, and
   a minor loop for receiving a third frame member of a third panel.

* * * * *